United States Patent
Jang et al.

(10) Patent No.: US 9,939,642 B2
(45) Date of Patent: Apr. 10, 2018

(54) GLASS TYPE TERMINAL AND CONTROL METHOD THEREOF

(71) Applicant: LG ELECTRONICS INC., Seoul (KR)

(72) Inventors: Yujune Jang, Seoul (KR); Taeseong Kim, Seoul (KR); Taekyoung Lee, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 14/682,738

(22) Filed: Apr. 9, 2015

(65) Prior Publication Data

US 2015/0362729 A1    Dec. 17, 2015

(30) Foreign Application Priority Data

Jun. 12, 2014  (KR) .......................... 10-2014-0071601

(51) Int. Cl.
*G02B 27/01* (2006.01)

(52) U.S. Cl.
CPC ....... *G02B 27/017* (2013.01); *G02B 27/0172* (2013.01); *G02B 2027/014* (2013.01); *G02B 2027/0138* (2013.01); *G02B 2027/0154* (2013.01); *G02B 2027/0178* (2013.01)

(58) Field of Classification Search
CPC .............. G02B 27/017; G02B 27/0172; G02B 2027/0178; G02B 2027/0154; G02B 2027/014; G02B 2027/0138
USPC ............................................................ 345/8
See application file for complete search history.

(56) References Cited

U.S. PATENT DOCUMENTS

| | | | | |
|---|---|---|---|---|
| 7,038,709 B1 * | 5/2006 | Verghese | ............... | F16M 11/10 348/169 |
| 9,223,136 B1 * | 12/2015 | Braun | ................... | G02B 27/017 |
| 2011/0074671 A1 * | 3/2011 | Shimosato | ......... | H04N 5/23293 345/156 |
| 2012/0033072 A1 * | 2/2012 | Lin | ........................ | G06T 7/2053 348/143 |
| 2013/0038759 A1 * | 2/2013 | Jo | ........................ | H04N 5/2256 348/240.99 |

* cited by examiner

*Primary Examiner* — Jimmy H Nguyen
(74) *Attorney, Agent, or Firm* — Lee, Hong, Degerman, Kang & Waimey PC

(57) ABSTRACT

Provided is a glass type terminal and a control method thereof. The glass type terminal includes: a frame unit configured to be wearable on a user's head; a display unit; and a control unit configured to turn on power of a camera when preset conditions are met, analyze an image captured by the camera to produce image capture guide information, and control the display unit to output the produced image capture guide information.

20 Claims, 12 Drawing Sheets

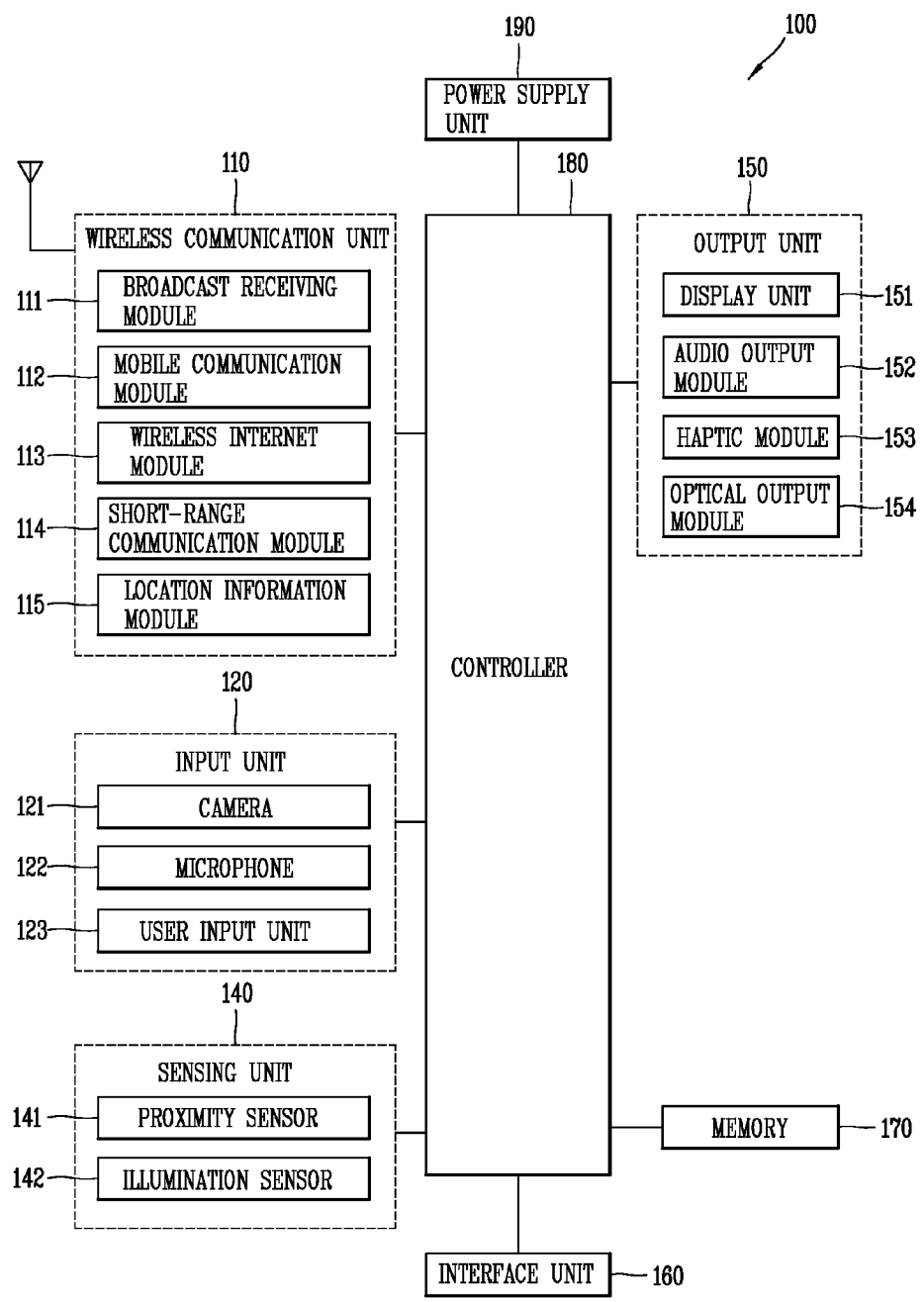

FIG. 5
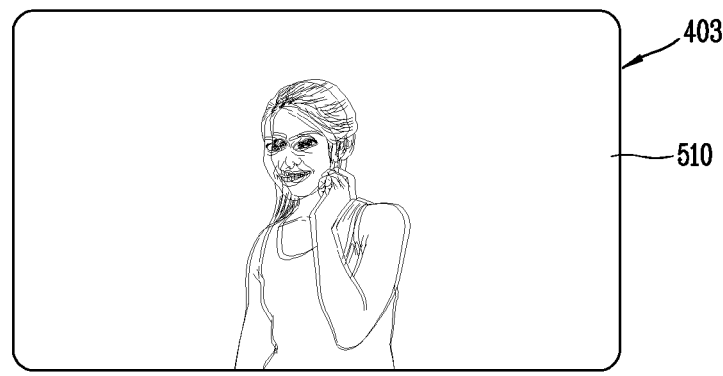
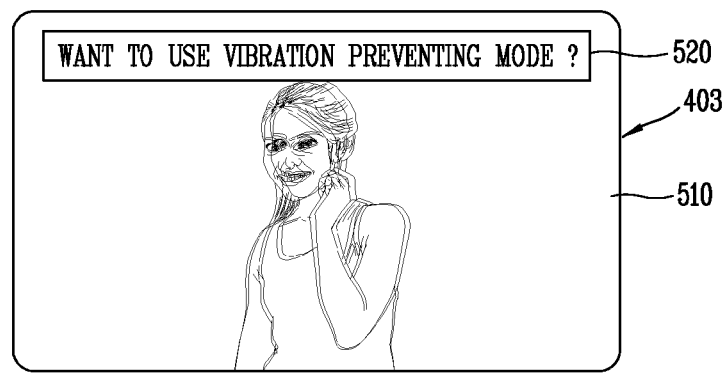
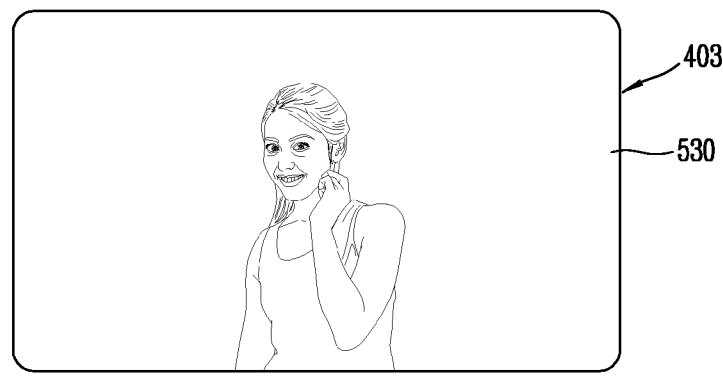

FIG. 9
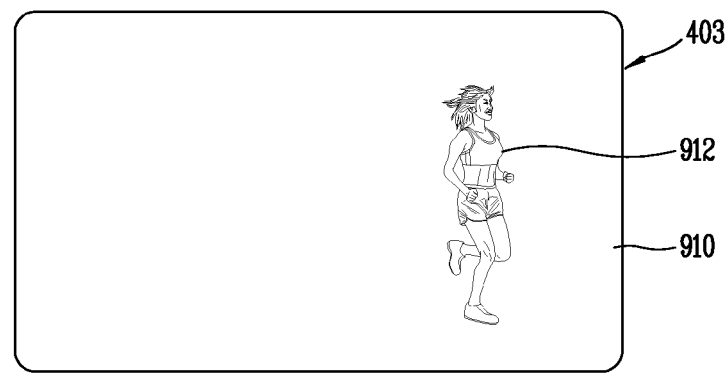
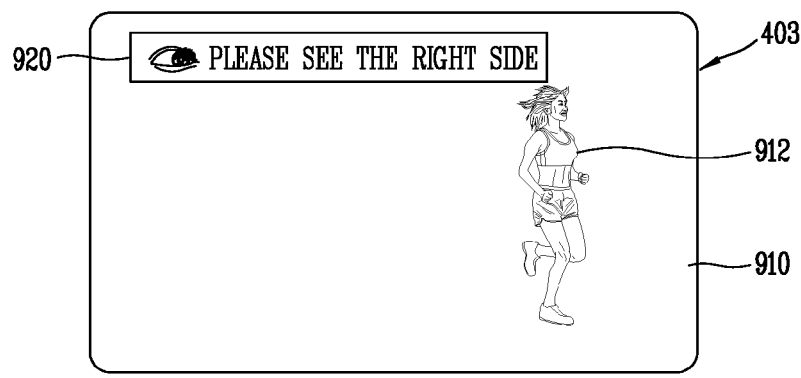
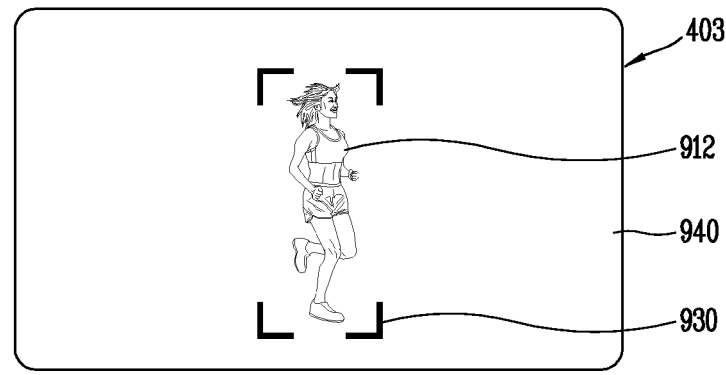

FIG. 10
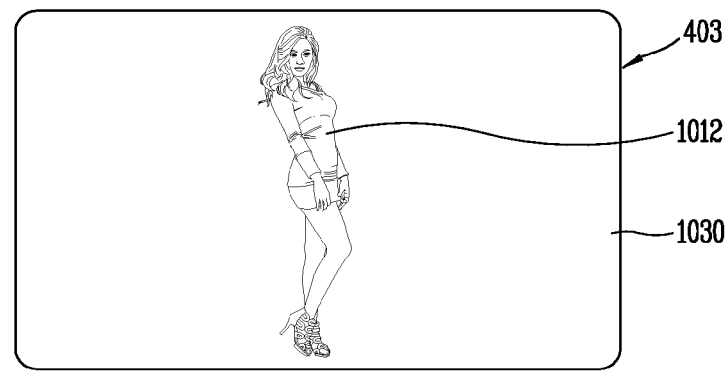

GLASS TYPE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0071601, filed on Jun. 12, 2014, the contents of which is incorporated by reference herein in its entirety.

BACKGROUND OF THE INVENTION

1. Field of the Invention

The present disclosure relates to a glass type terminal that can be worn on a user's head, like glasses, and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

Recently, mobile terminals extend to wearable devices that can be worn on users' body, beyond the level at which users use mobile terminal held in hand. An example of wearable devices may be a glass type terminal.

Also, according to a glass type terminal, an image the same as that viewed by a user may be captured. However, when a camera of a glass type terminal is turned on constantly, battery consumption may increase to generate heat.

SUMMARY OF THE INVENTION

Accordingly, an aspect of the present invention is to address the above-noted and other problems.

Another aspect of the present invention is to provide a glass type terminal adapted for turning on power of a camera when preset conditions are detected, analyzing an image captured by the camera, and providing image capture guide information according to analysis results, and a control method thereof.

To achieve these and other advantages and in accordance with the purpose of this specification, as embodied and broadly described herein, a glass type terminal includes: a frame unit configured to be wearable on a user's head; a display unit; and a control unit configured to turn on power of a camera when preset conditions are met, to analyze an image captured by the camera to produce image capture guide information, and to control the display unit to output the produced image capture guide information.

In an exemplary embodiment of the present disclosure, the control unit may sense the preset conditions on the basis of at least one among a touch input from the user, a voice input from the user, and body information of the user.

In an exemplary embodiment of the present disclosure, when a user's control command to follow the output image capture guide information is input, the control unit may control the camera to capture an image according to the output image capture guide information and store the captured image.

In an exemplary embodiment of the present disclosure, when a movement of a subject is sensed from the image captured by the camera, the control unit may output moving of the user's eyes to follow the movement of the subject, as image capture guide information.

In an exemplary embodiment of the present disclosure, when a movement of a subject is sensed from the image captured by the camera, the control unit may output continuously capturing images or video by using the camera according to the movement of the subject, as the image capture guide information.

In an exemplary embodiment of the present disclosure, when a user's control command to follow the output image capture guide information is input, the control unit may control the camera to rotate to continuously capture images or video.

To achieve these and other advantages and in accordance with the purpose of this specification, as embodied and broadly described herein, a method for controlling a glass type terminal includes: (a) sensing preset conditions; (b) when it is sensed that a particular user's motion or behavior satisfies preset conditions, turning on power of a camera; (c) analyzing an image captured by the camera to product image capture guide information; and (d) outputting the produced image capture guide information to the display unit.

In an exemplary embodiment of the present disclosure, operation (a) may include: sensing the preset conditions on the basis of at least one among a touch input from the user, a voice input from the user, and body information of the user.

In an exemplary embodiment of the present disclosure, the method may further include: e) when a user's control command to follow the output image capture guide information is input, controlling the camera to capture an image according to the output image capture guide information and providing control to store the captured image.

In an exemplary embodiment of the present disclosure, operation (d) may include: when a movement of a subject is sensed from the image captured by the camera, outputting moving of the user's eyes to follow the movement of the subject, as the image capture guide information.

In an exemplary embodiment of the present disclosure, operation (d) may include: when a movement of a subject is sensed from the image captured by the camera, outputting images or video continuously captured by the camera according to the movement of the subject, as the image capture guide information.

In an exemplary embodiment of the present disclosure, operation (d) may include: when a user's control command to follow the output image capture guide information is input, rotating the camera to continuously capture images or video.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with the present disclosure.

FIG. 5 is a conceptual view illustrating an exemplary embodiment in which the use of a vibration preventing mode is proposed as image capture guide information.

FIGS. 9 and 10 are conceptual views illustrating exemplary embodiments in which user's response according to a movement of a subject is proposed as image capture guide information.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
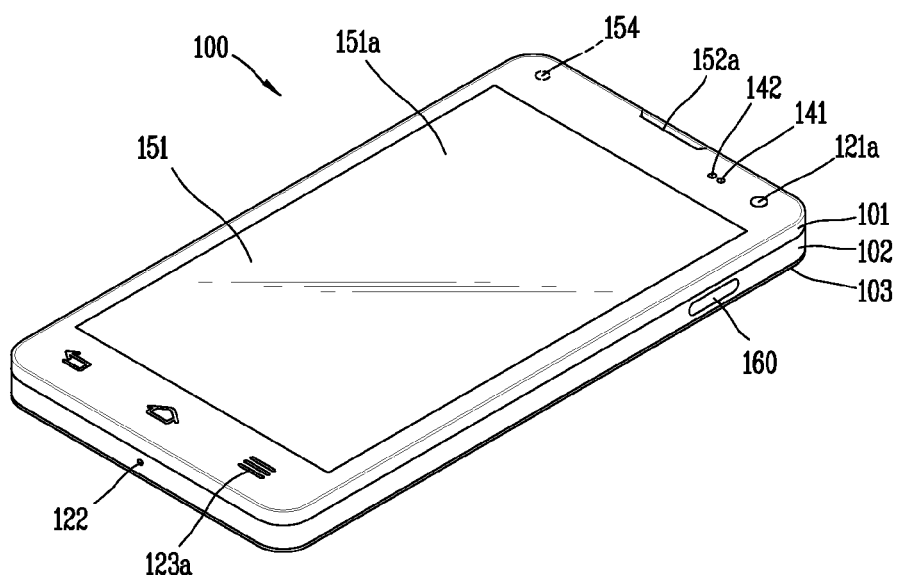
FIGS. 1B and 1C are conceptual views of one example of the mobile terminal, viewed from different directions.
Figure 1C:
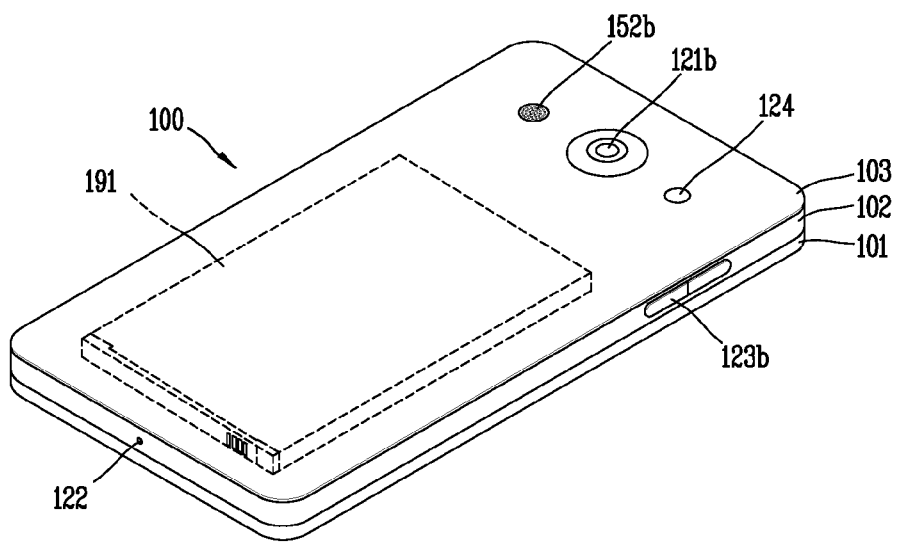

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA 2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1B. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the control unit 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
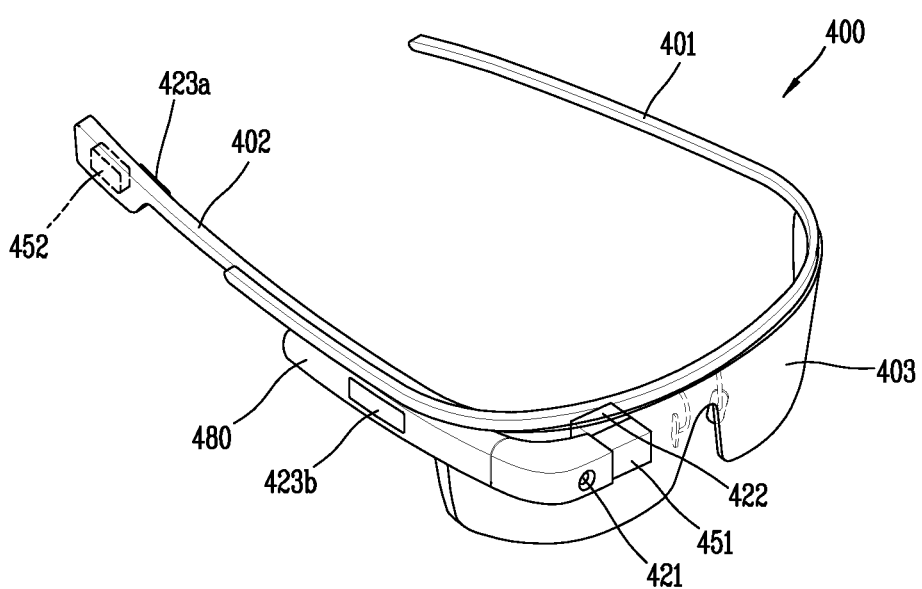
FIG. 2 is a perspective view illustrating an example of a glass type mobile terminal related to another exemplary embodiment of the present disclosure.

FIG. 2 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

Figure 4:
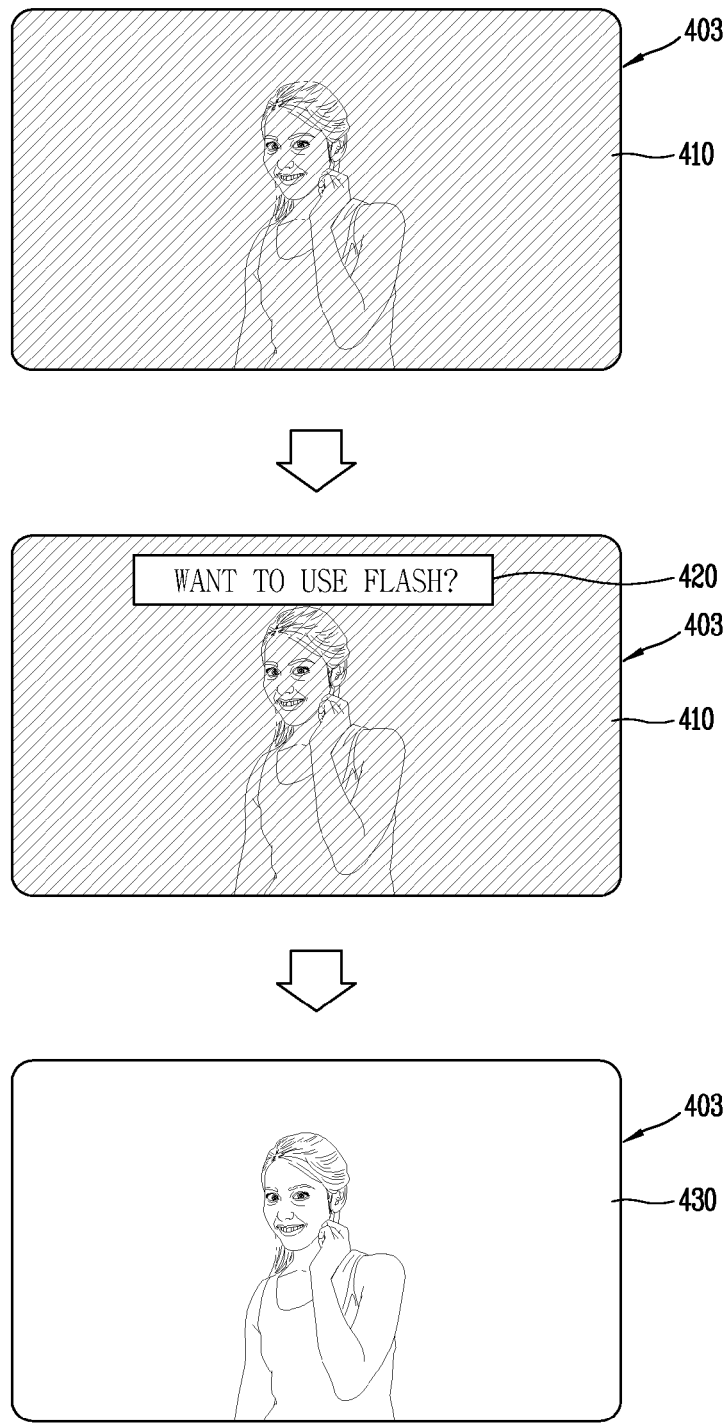
FIG. 4 is a conceptual view illustrating an exemplary embodiment in which the use of a flash is proposed as image capture guide information.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The internal camera 422 may be disposed to be adjacent to at least one of the user's left eye and right eye and may face the interior of the lens 403 in order to capture an image of the user's eyes. In detail, the internal camera 422 may capture an image of user's blinking of eyes, a movement of the pupil, a size of the eyes, and the like.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Hereinafter, embodiments related to a control method that can be implemented in the mobile terminal configured as described above will be described with reference to the accompanying drawings. It is apparent to those skilled in the art that modification, alteration, and improvement can be made to the present invention within a scope that does not deviate from the nature and gist of the present invention.

Figure 3:
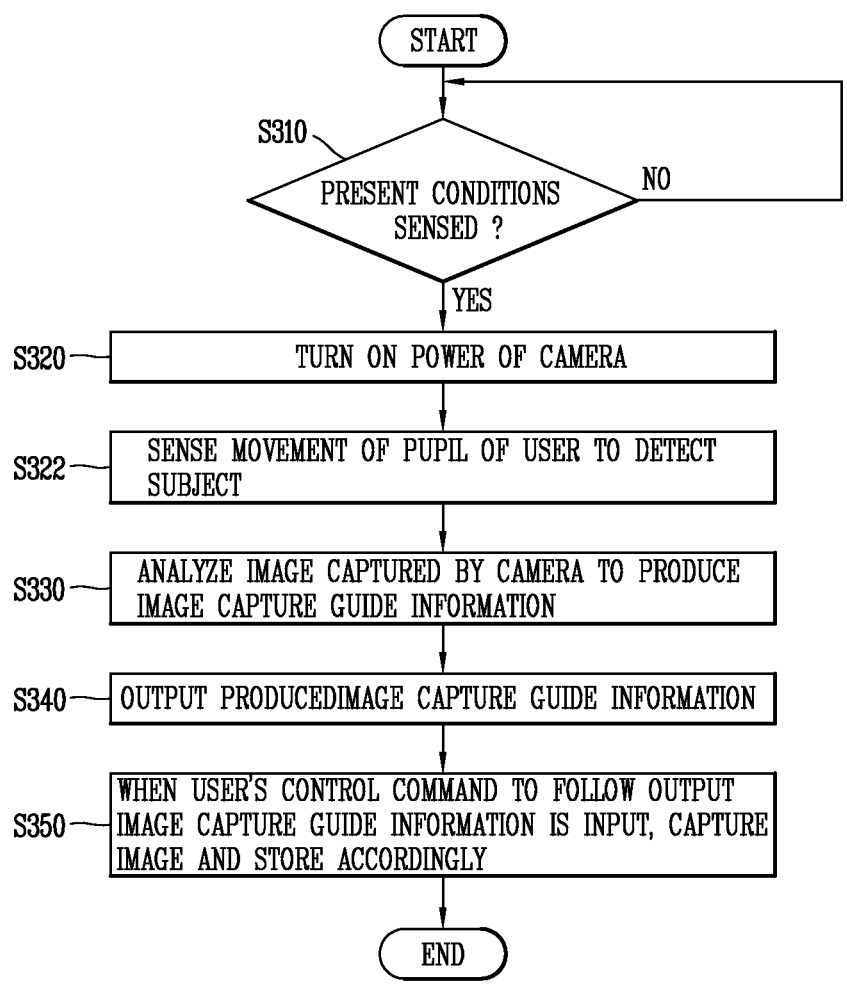
FIG. 3 is a flow chart illustrating an operation method of a glass type terminal according to an exemplary embodiment of the present disclosure.

FIG. 3 is a flow chart illustrating an operation method of a glass type terminal 400 (please refer to FIG. 2) according to an exemplary embodiment of the present disclosure. The glass type terminal 400 includes a frame unit 401, frame units 401 and 402, a display unit 451, and a controller 480.

Referring to FIG. 3, first, preset conditions are sensed in step S310.

In detail, preset conditions may be sensed on the basis of a touch input applied by a user, a voice input applied by the user, a body information of the user, and the like.

The body information may refer to comprehensive information derived from the user's body, such as a user's gaze, the size of a pupil of the eyes, a size of the eyes, the number of times of blinking the eyes, a movement of the user's head, a period of time during which the user faces in a particular direction, whether the user looks at a particular subject, and the like.

In an exemplary embodiment, a case in which the user touches the frame 401 or 402, a case in which the size of the pupil of the user increases, a case in which the user faces in a fixed direction for a long period of time, a case in which the user's cheek comes into contact with the lens 403, a case in which user's smile is sensed on the user's face muscle, a case in which the user turns his or her head suddenly, a case in which the user's eyes does not face the front, a case in which the user senses a particular subject, a case in which the user tilts his or her head, and the like, may be set as conditions in advance.

In another exemplary embodiment, a case in which a user's voice such as "Whoops!", "What's that?", "Looks delicious", "Wow", and the like, is input may be set as conditions in advance.

Subsequently, when preset conditions are detected, power of the camera 421 is turned in step S320. When the preset conditions are not sensed, the process is returned to the step S310 to detect the conditions again.

Namely, only when the preset conditions are sensed, power of the camera 421 is turned on, thus reducing battery consumption of the glass type terminal 400. Also, a heating problem that may arise in the glass type terminal 400 may be solved.

A movement of the pupil of the user is sensed to detect a subject in step S322.

In detail, a movement of the pupil of the user may be sensed by the internal camera 422 which is disposed to be adjacent to at least one of the left eye and the right eye of the user and faces the user's eyes.

Also, a subject may be detected by using the sensed movement of the pupil of the user. For example, in a case in which the user's pupil moves in line with a particular object, the particular object may be detected by the subject desired to be imaged by the user.

Thereafter, the image captured by the camera 421 is analyzed to obtain image capture guide information in step S330.

In detail, a composition, brightness, a degree of vibration, states of the user and the subject, and the like, are analyzed on the basis of the image captured by the camera 421 in a turned-on state, and image capture guide information proposing an optimized image capture environment is produced.

Thereafter, the produced image capture guide information is output in step S340.

In detail, the produced image capture guide information may be provided as visual information to the user through the display unit 451.

In another exemplary embodiment, the image capture guide information may be provided as voice information to the user through the audio output module 452.

Subsequently, when a user's control command that follows the output image capture guide information is input, the camera 421 is controlled to capture an image according to the output image capture guide information and the captured image is controlled to be stored in step S350.

In an exemplary embodiment, the user may input a control command to capture an image according to the image capture guide information by touching the user input unit 423*a* or 423*b*.

In another exemplary embodiment, the user may input a control command to capture an image according to the image capture guide information by voice through a microphone.

Hereinafter, exemplary embodiments of the glass type terminal 400 to which image capture guide information is provided will be described with reference to FIGS. 4 through 11. FIGS. 4 through 11 illustrate scenes seen to the user through the lens 403 of the glass type terminal 400.

FIG. 4 is a conceptual view illustrating an exemplary embodiment in which the use of a flash is proposed as image capture guide information.

Referring to the first drawing of FIG. 4, when it is sensed that a particular user's motion or behavior satisfies preset conditions, power of the camera 421 may be turned on and an image 410 may be captured. Here, a plurality of images may be captured in order to accurately analyze a current image capture state.

For example, when a voice such as "Ah", "Oh", and the like, is input from the user, power of the camera 421 may be automatically turned on and the image 410 is captured. Here, the camera 421 may sense a movement of the pupil of the user to detect a subject, and capture the image 410 such that the detected subject is included.

Referring to the second drawing of FIG. 4, when it is determined that brightness of the image 410 captured in the first drawing of FIG. 4 is dark, image capture guide information 420 asking whether to use a flash may be output. Here, a voice of the contents asking whether to use the flash may be output together.

Referring to the third drawing of FIG. 4, when the user inputs a control command to use a flash, an image 430 is captured by using the flash.

For example, when the user makes a gesture of nodding his head, the camera 421 may capture the image 430 again by using the flash.

FIG. 5 is a conceptual view illustrating an exemplary embodiment in which the use of a vibration preventing mode is proposed as image capture guide information.

Referring to the first drawing of FIG. 5, when it is sensed that a particular user's motion or behavior satisfies preset conditions, power of the camera 421 may be turned on and an image 510 may be captured. Here, a plurality of images may be captured in order to accurately analyze the current image capturing state.

For example, when a user's touch input of tapping the frame of the smart glass 400 is sensed, power of the camera 421 is automatically turned on and the image 510 may be captured. Here, the camera 421 may sense a movement of the pupil of the user to detect a subject and capture the mage 510 to include the detected subject.

Referring to the second drawing of FIG. 5, when it is determined that the image 510 captured in the first drawing of FIG. 5 has vibrated, image capture guide information 520 inquiring as to whether to use a vibration preventing mode may be output. Here, a voice of the contents inquiring whether to use the vibration preventing mode may be output together.

In another exemplary embodiment, image capture guide information inquiring as to whether to re-capture an image without a movement or vibration may be output.

Referring to the third drawing of FIG. 5, when the user inputs a control command to use the vibration preventing mode, the image 530 is captured by using the vibration preventing mode.

For example, when the user answers "Yes", the image 530 may be captured again in the vibration preventing mode state.

Figure 6:
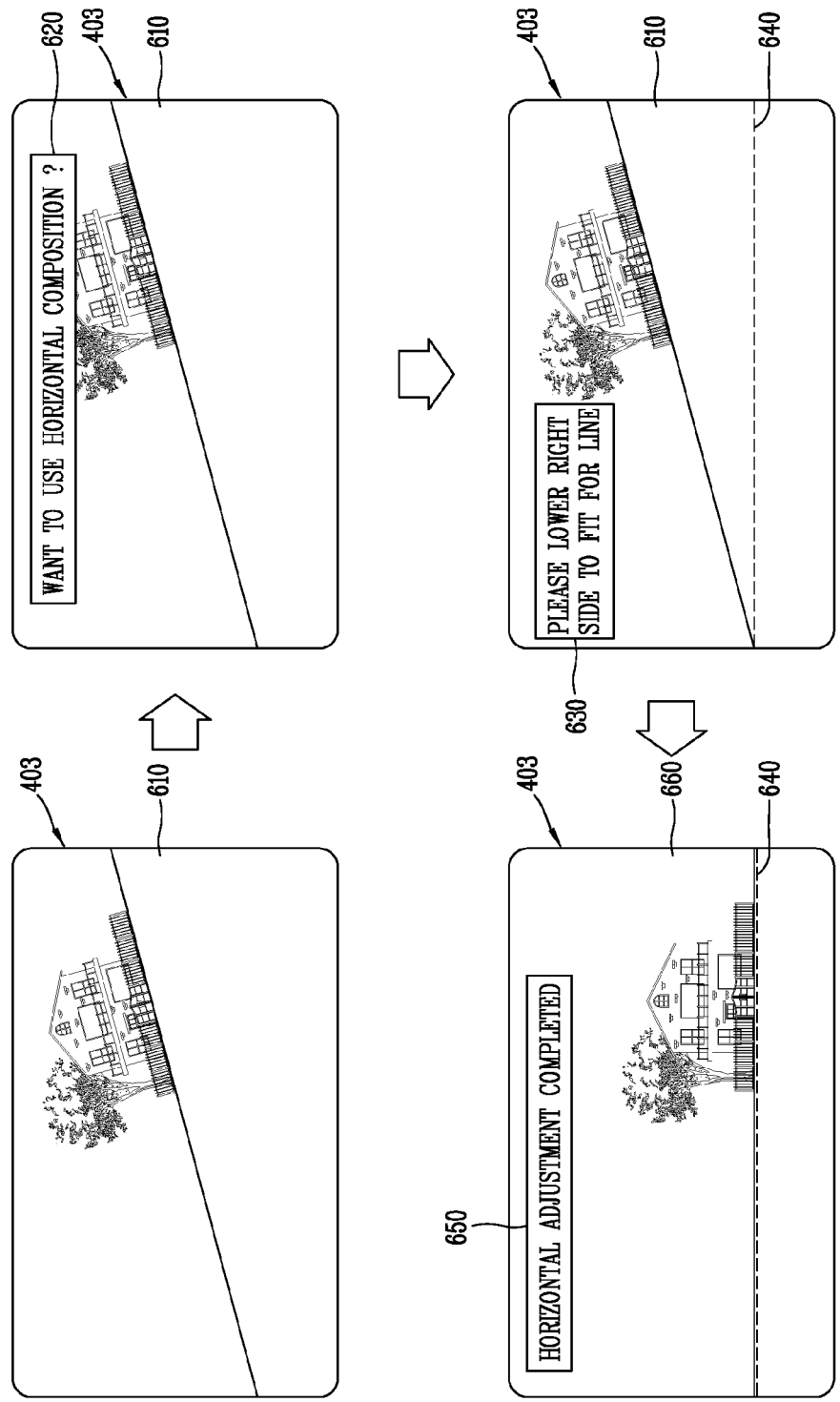
FIG. 6 is a conceptual view illustrating an exemplary embodiment in which the use of a horizontal composition is proposed as image capture guide information.

FIG. 6 is a conceptual view illustrating an exemplary embodiment in which the use of a horizontal composition is proposed as image capture guide information.

Referring to the first drawing of FIG. 6, when it is sensed that a particular user's motion or behavior satisfies preset conditions, power of the camera 421 may be turned on and an image 610 may be captured.

For example, in a case in which the user gazes in a fixed direction, power of the camera 421 is automatically turned on and an image 610 may be captured. Here, the camera 421 may detect a movement of the pupil of the user to detect a subject and capture the image 610 to include the detected subject.

Referring to the second drawing of FIG. 6, when it is determined that a composition of the image 610 captured in the first drawing of FIG. 6 inclines, image capture guide information 620 inquiring as to whether to capture an image in a horizontal composition may be output. Here, a voice of the contents proposing capturing of an image in the horizontal composition may be output together.

In another exemplary embodiment, image capture guide information proposing a different image capture composition such as a triangular composition, or the like, may be output.

Referring to the third drawing of FIG. 6, when the user inputs a control command to capture an image with the horizontal composition, image capture guide information 630 therefore may be output again.

For example, in a case in which the user makes a gesture of nodding his or her head or answers "Yes", the image capture guide information 630 asking that the user's head should be lowered to the right in order to the horizontal composition may be output. Also, to this end, a horizontal line 640 as a reference may be output together.

Referring to the fourth drawing of FIG. 6, when the user lowers his or her head to the right so the ground is identical to the horizontal line 640 as a reference, a message 650 indicating that the horizontal adjustment has been completed may be output.

Also, when the ground is identical to the horizontal line 640 as a reference, the camera 421 automatically captures an image 660.

Figure 7:
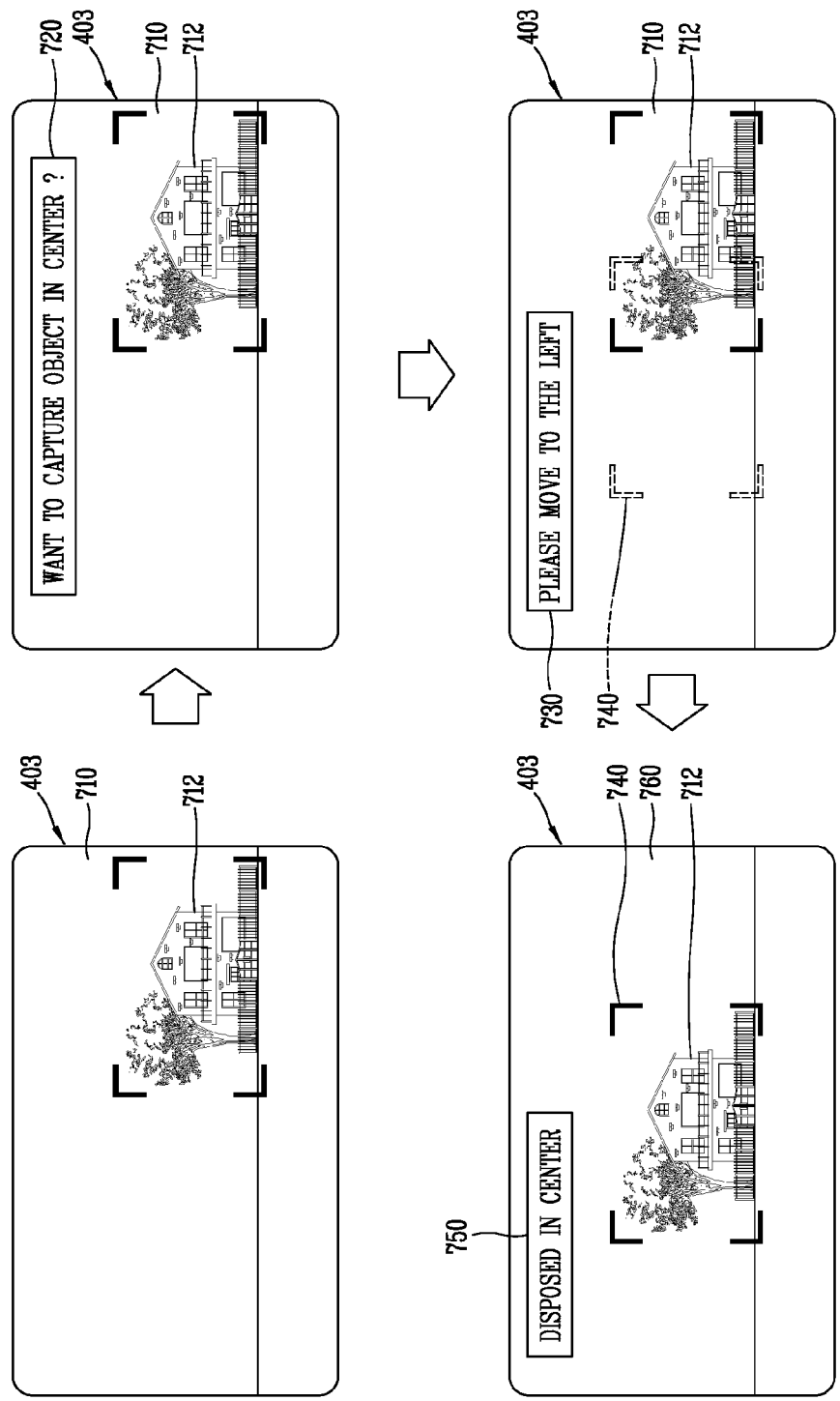
FIGS. 7 and 8 are conceptual views illustrating an exemplary embodiments in which the use of a central composition is posed as image capture guide information.
Figure 8:
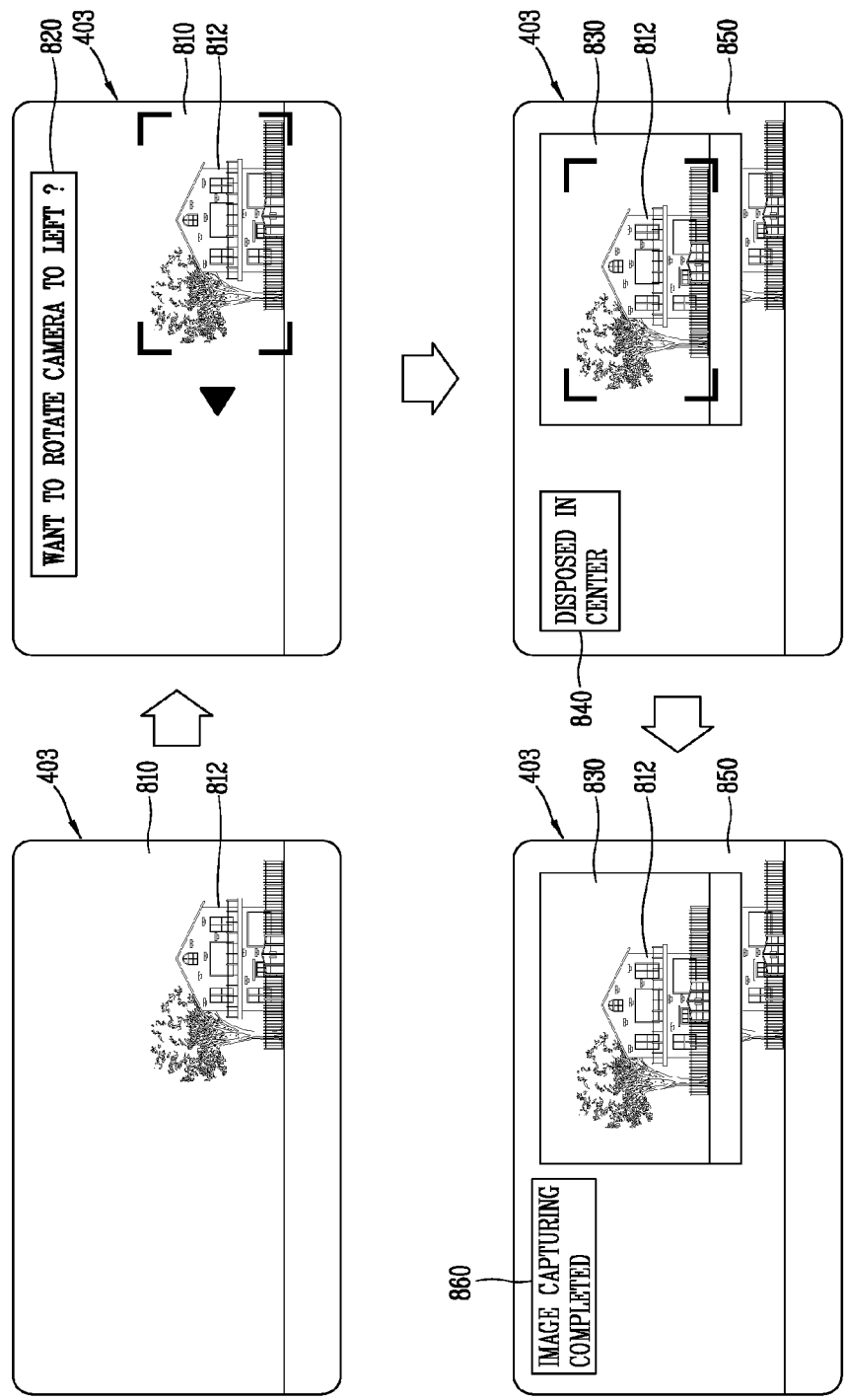

FIGS. 7 and 8 are conceptual views illustrating an exemplary embodiments in which the use of a central composition is posed as image capture guide information.

Referring to the first drawing of FIG. 7, when it is sensed that a particular user's motion or behavior satisfies preset conditions, power of the camera 421 is turned on and an image 710 may be captured.

For example, when the size of the user's eyes increases, power of the camera 421 is automatically turned on and the image 710 is captured. Here, the camera 521 may sense a movement of the pupil of the user to detect a subject 712, and capture the image 710 to include the detected subject 712.

Referring to the second drawing of FIG. 7, when it is determined that the subject 712 is not positioned in the center of the captured image 710, image capture guide information 720 proposing image capturing by placing the subject 712 in the center may be output. Here, a voice of contents proposing image capturing with the subject 712 placed in the center may be output together.

Referring to the third drawing of FIG. 7, when the user taps on the frame of the smart glass 400, image capture guide information 730 requesting a movement to the left may be output. Also, to this end, a reference position 740 may be output together.

Referring to the fourth drawing of FIG. 7, when the user moves to the left and the subject 712 is disposed in the reference position 740, a message 750 indicating that the subject 712 is disposed in the center may be output.

Also, when the subject 712 is disposed in the reference position 740, the camera 421 automatically captures an image 760.

In another exemplary embodiment referring to the first drawing of FIG. 8, when it is sensed that a particular user's motion or behavior satisfies preset conditions, power of the camera 421 is turned on and an image 810 may be captured.

For example, in a case in which a change in the muscles of the user's face is sensed and the user smiles, power of the camera 421 may be turned on and the image 810 may be captured. Here, the camera 421 may sense a movement of the pupil of the user to detect a subject 812 and capture the image 810 to include the detected subject 812.

Referring to the second drawing of FIG. 8, when it is determined that the subject 812 in the first drawing of FIG. 8 is not positioned in the center of the captured image 810, image capture guide information 820 proposing rotation of the camera 421 may be output. Here, a voice of contents of proposing rotation of the camera 421 may also be output together.

Referring to the third drawing of FIG. 8, when the user inputs a control command to rotate the camera 421, an image 830 to be captured by rotating the camera 421 may be proposed in advance.

For example, when the user slowly blinks his or her eyes, the image 830 to be captured by rotating the camera 421 may be proposed in advance.

In detail, the image 830 to be captured by rotating the camera 421 may be output to overlap with the image 850 viewed by the user through the lens 403 of the glass type terminal 400. Also, a message 840 indicating that the subject 812 is disposed in the center according to the rotation of the camera 421 may be output together.

Referring to the fourth drawing of FIG. 8, when the subject 812 is disposed in the center according to the rotation of the camera 421, the camera 421 automatically captures the corresponding image 830. Also, a message 860 indicating that image capturing is completed may be output.

Meanwhile, when a movement of the subject is sensed from the image captured by the camera 421, a movement of eyes that following the movement of the subject may be output as image capture guide information.

Also, when it is sensed from the image captured by the camera 421 that the subject is moving, capturing an image continuously according to a movement of the subject by the camera 421 or capturing video may be output as image capture guide information.

FIGS. 9 and 10 are conceptual views illustrating exemplary embodiments in which user's response according to a movement of a subject is proposed as image capture guide information.

Referring to the first drawing of FIG. 9, when it is sensed that a particular user's motion or behavior satisfies preset conditions, power of the camera 421 may be turned on an image 910 may be captured.

For example, when the user, who is looking at in one direction, turns his or her head in a different direction suddenly, power of the camera 421 may be turned on and the image 910 may be captured. Here, the camera 421 may sense a movement of the pupil of the user to detect a subject 912 and capture the image 910 to include the detected subject 912.

Referring to the second drawing of FIG. 9, when it is determined that the subject 912 is moving in the first drawing of FIG. 9, image guide information 920 proposing a movement of the user's eyes may be output. Here, a voice of the contents of proposing the movement of the user's eyes may also be output together.

Referring to the third drawing of FIG. 9, when the user's eyes move to the right and the subject 912 is positioned in the center 930 of a view finder, the camera 421 automatically captures an image 940.

In another exemplary embodiment, referring to the first drawing of FIG. 10, when it is sensed that a particular user's motion or behavior satisfies preset conditions, power of the camera 421 may be turned on and an image 1010 may be captured.

For example, in a case in which the user gazes at a particular target 1012 such as a person, power of the camera 421 is automatically turned on and the image 1010 may be captured. Here, the camera 421 may sense a movement of the pupil of the user to detect the subject 1012 and capture the image 1010 to include the detected subject 1012.

Referring to the second drawing of FIG. 10, when it is determined that the subject 1012 is moving in the first drawing of FIG. 10, image capture guide information 1020 proposing adjustment of a distance to the subject 1012 may be output.

For example, in a case in which the person 1012 walks toward the user, the image capture guide information 1020 requesting the user to maintain a distance to the person 1012 farther may be output. Here, a voice of the contents of maintaining the distance to the person 1012 farther may be output together. Alternatively, image capture guide information requesting the user to turn his or her head to change a direction may be output.

Referring to the third drawing of FIG. 10, when the user moves and the entire shape of the person 1012 is captured by the view finder, the camera 421 automatically captures an image 1030.

Figure 11:
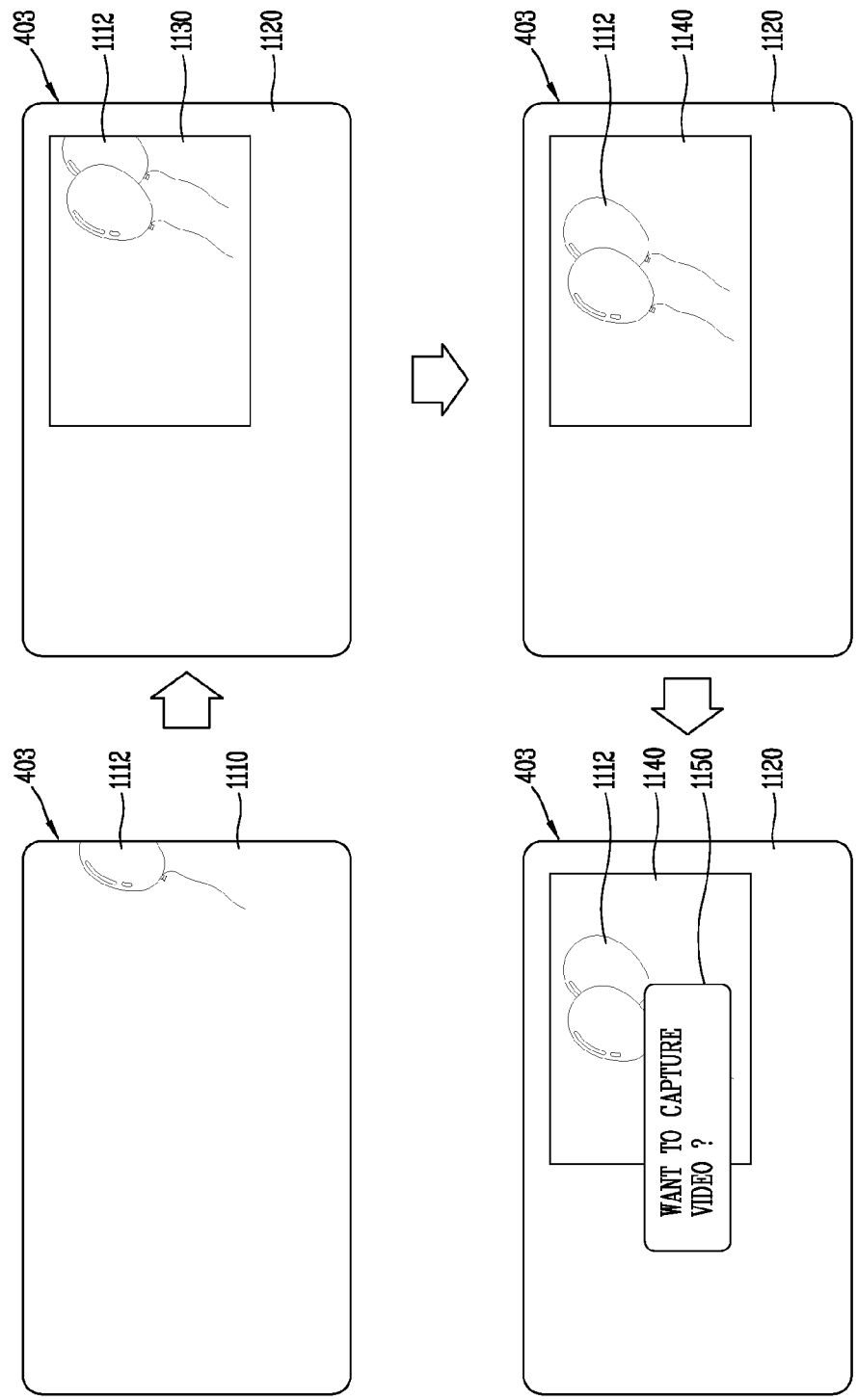
FIG. 11 is a conceptual view illustrating an exemplary embodiment in which a response of a camera according to a movement of a subject is proposed as an image capture guide information.

FIG. 11 is a conceptual view illustrating an exemplary embodiment in which a response of a camera according to a movement of a subject is proposed as an image capture guide information.

Referring to the first drawing of FIG. 11, when it is sensed that a particular user's motion or behavior satisfies preset conditions, power of the camera 421 is turned on and an image 1110 may be captured.

For example, when the user gazes at a moving object 1112, power of the camera 421 may be automatically turned on and the image 1110 may be captured. Here, the camera 421 may capture the image 1110 to include the subject 1112 detected according to a movement of the pupil of the user.

Referring to the second drawing of FIG. 11, when it is determined that the subject 1112 is moving in the first drawing of FIG. 11. the camera 421 may be rotated according to the direction in which the subject 1112 moves, to continuously capture images.

In detail, the image 1130 continuously captured by rotating the camera 421 may be output to overlap with an image 1120 viewed by the user through the lens 403 of the glass type terminal 400. To this end, the camera 421 of the glass type terminal 400 may be implemented in the form of rotating by 360 degrees according to a movement of a subject.

Referring to the third drawing of FIG. 11, when the entirety of the subject 1112 is captured by the view finder according to the rotation of the camera 421 or positioned in the center of the view finder, automatic image capturing by the camera 421 is stopped.

In another exemplary embodiment, the camera 421 may be continuously rotated to automatically capture an image only when the entirety of the subject 1112 is captured in the view finder, or continuously automatically capture an image until when the subject 1112 disappears from the view finder.

Referring to the fourth drawing of FIG. 11, even after the automatic image capturing, a message inquiring whether image capturing is to be continued or a message 1150 inquiring whether a video is to be captured may be output.

Accordingly, when the user's control command to follow the output image capture guide information 1150 is input, the camera 421 may be rotated to continuously capture an image or video. Here, even when the user's eyes does not face a subject, the camera 421 may be rotated to capture an image of the subject.

Subsequently, the user may input a command to store the captured image. For example, in a case in which the user blinks his or her eyes or touches the frame, the captured image may be stored.

In another exemplary embodiment, when a command to store the captured image is not input from the user, an image capture situation may be analyzed again and corresponding new image capture guide information may be proposed.

In another exemplary embodiment, the images continuously captured according to the rotation of the camera 421 may be automatically stored even without the user's command to store them.

According to at least one of the exemplary embodiments of the present disclosure, battery consumption of the glass type terminal may be reduced and a heating problem may be solved.

Also, According to at least one of the exemplary embodiments of the present disclosure, user convenience can be enhanced by proposing an optimized image capture condition.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A glasses-type terminal comprising:
a frame configured to be worn on a user's head;
a camera configured to capture images;
a display unit; and
a control unit configured to:
activate the camera when at least one of a plurality of preset conditions is met;
detect information of a composition of the captured images, a brightness of an environment, a degree of vibration of the terminal, or movement of a subject based on the captured images;
generate image capture guide information based on the detected information, wherein the image capture guide information includes an optimized image capture setting;
cause the display unit to display the image capture guide information based on the captured images;
change a capturing direction of the camera to follow a movement of the subject detected based on the captured images and cause the camera to capture a plurality of consecutive images in a burst mode or a video mode when the movement of the subject is detected in the captured images; and cause the display unit to display the captured plurality of captured images to be overlapped on a view of the user through the terminal, wherein the capturing direction of the camera and the view of the user through the terminal are different.

2. The glasses-type terminal of claim 1, wherein the control unit is further configured to determine that the at least one of the plurality of preset conditions is met based on at least a touch input, a voice input, or biometric information of the user.

3. The glasses-type terminal of claim 1, wherein the control unit is further configured to cause the camera to capture an image in response to a user control command according to the image capture guide information.

4. The glasses-type terminal of claim 1, wherein the image capture guide information includes instruction for the user to visually follow the subject when movement of the subject is detected in the captured images.

5. The glasses-type terminal of claim 1, wherein:
the image capture guide information comprises information for continuing capture of the plurality of consecutive images.

6. The glasses-type terminal of claim 5, wherein the information for continuing capture of the plurality of consecutive images comprises at least:
instruction for the user to visually follow the subject, information related to rotation of the camera, or information related to the burst mode or the video mode.

7. The glasses-type terminal of claim 5, wherein the control unit is further configured to cause the camera to cease capturing the plurality of consecutive images when the subject is no longer included in the obtained image.

8. The glasses-type terminal of claim 5, wherein the control unit is further configured to cause the camera to rotate to continue capturing the plurality of consecutive images of the subject in response to a user control command according to the image capture guide information.

9. The glasses-type terminal of claim 1, wherein:
the image capture guide information comprises instruction to the user to move the camera to include an object in the center of the obtained image; and
the control unit is further configured to cause the camera to capture the image in response to a user control command according to the image capture guide information.

10. The glasses-type terminal of claim 1, wherein:
the image capture guide information comprises instruction to the user to tilt the camera to level the obtained image; and
the control unit is further configured to cause the camera to capture the image in response to a user control command according to the image capture guide information.

11. A method for controlling a glasses-type terminal worn on a user's head, the method comprising:
activating a camera of the terminal when at least one of a plurality of preset conditions is met;
detecting information of at least an image composition of images captured by the camera, an image brightness of an environment of the images captured by the camera, vibration of the camera, or movement of a subject based on the images captured by the camera;
generating image capture guide information based on the detected information, wherein the image capture guide information includes an optimized image capture setting;
displaying the image capture guide information based on the images captured by the camera;
changing a capturing direction of the camera to follow a movement of the subject detected based on the captured images and capturing a plurality of consecutive images in a burst mode or a video mode when movement of the subject is detected based on the images captured by the camera; and
displaying the captured plurality of images to be overlapped on a view of the user through the terminal, wherein the capturing direction of the camera and the view of the user through the terminal are different.

12. The method of claim 11, further comprising determining that the at least one of the plurality of preset conditions is met based on at least a touch input, a voice input, or biometric information of the user.

13. The method of claim 11, further comprising capturing an image in response to a user control command according to the image capture guide information.

14. The method of claim 11, wherein the image capture guide information includes instruction for the user to visually follow a subject when movement of the subject is detected in the captured images.

15. The method of claim 11,
wherein the image capture guide information comprises information for continuing capture of the plurality of consecutive images.

16. The method of claim 15, wherein the information for continuing capture of the plurality of consecutive images comprises at least instruction for the user to visually follow the subject, information related to rotation of the camera, or information related to the burst mode or the video mode.

17. The method of claim 15, further comprising ceasing capturing the plurality of consecutive images when the subject is no longer included in the obtained image.

18. The method of claim 15, further comprising rotating the camera to continue capturing the plurality of consecutive images of the subject in response to a user control command according to the image capture guide information.

19. The method of claim 11, wherein the image capture guide information comprises instruction to the user to move the camera to include an object in the center of the obtained image; and
the method further comprises capturing the image in response to a user control command according to the image capture guide information.

20. The method of claim 11, wherein the image capture guide information comprises instruction to the user to tilt the camera to level the obtained image; and
the method further comprises capturing the image in response to a user control command according to the image capture guide information.

* * * * *